(12) United States Patent
Pohjola

(10) Patent No.: US 6,469,404 B1
(45) Date of Patent: Oct. 22, 2002

(54) INTELLIGENT CONTROL SYSTEM FOR CURRENT DISTRIBUTION IN A VEHICLE

(75) Inventor: Jorma Pohjola, Varjakka (FI)

(73) Assignee: IWS International Inc., Oulu (FI)

( * ) Notice: Subject to any disclaimer, the term of this patent is extended or adjusted under 35 U.S.C. 154(b) by 0 days.

(21) Appl. No.: 09/554,491

(22) PCT Filed: Nov. 13, 1998

(86) PCT No.: PCT/FI98/00884

§ 371 (c)(1),
(2), (4) Date: May 12, 2000

(87) PCT Pub. No.: WO99/26331

PCT Pub. Date: May 27, 1999

(30) Foreign Application Priority Data

Nov. 14, 1997 (FI) .................................................. 974237

(51) Int. Cl.⁷ .............................................. B60R 16/02
(52) U.S. Cl. ........................................ 307/10.1; 307/9.1
(58) Field of Search ................................ 307/9.1, 10.1, 307/38–41

(56) References Cited

U.S. PATENT DOCUMENTS

| | | | |
|---|---|---|---|
| 4,180,803 A | 12/1979 | Wesmeyer et al. | 340/164 R |
| 4,355,385 A | 10/1982 | Hampshire et al. | 370/85 |
| 4,516,121 A | 5/1985 | Moriyama et al. | 340/825.05 |
| 4,646,232 A | 2/1987 | Chang et al. | 364/200 |
| 4,956,561 A * | 9/1990 | Tamer | 307/10.1 |
| 5,313,460 A * | 5/1994 | Schmid | 370/85.1 |
| 5,508,689 A * | 4/1996 | Rado et al. | 307/10.1 |
| 5,637,933 A | 6/1997 | Rawlings et al. | 307/147 |
| 5,670,845 A * | 9/1997 | Grant et al. | 307/10.1 |
| 5,844,501 A * | 12/1998 | El-Ibiary | 340/870.17 |
| 6,107,696 A * | 8/2000 | Peter et al. | 307/10.1 |
| 6,249,060 B1 * | 6/2001 | Osha | 307/10.1 |
| 6,331,823 B1 * | 12/2001 | El-Ibiary | 340/870.16 |

FOREIGN PATENT DOCUMENTS

| | | | |
|---|---|---|---|
| EP | 0266704 | 5/1988 | B60R/16/02 |
| EP | 0791506 | 8/1997 | B60R/16/02 |
| EP | 0564943 | 6/2001 | |
| SE | 0507046 | 3/1998 | G06F/13/40 |
| WO | 9310591 | 5/1993 | |
| WO | 9515594 | 6/1995 | |
| WO | 9702965 | 1/1997 | |
| WO | 9830961 | 7/1998 | G06F/13/40 |

* cited by examiner

Primary Examiner—Fritz Fleming
(74) Attorney, Agent, or Firm—Davidson, Davidson & Kappel, LLP

(57) ABSTRACT

The invention relates to an intelligent control system for current distribution in a vehicle. The current distribution and communication transmission are handled by a central unit which is divided into structurally discrete junction modules (2), each of which connects to its own cable branch (4). Each junction module controls independently the power supply and communication transmission for the cable branch (4) attached thereto. The central unit is further provided with elements for the transmission and reception of communication between the junction modules (2). The intelligence required for the load-specific operating control is decentralized to connecting sockets (3) present in the cable branches (4).

16 Claims, 8 Drawing Sheets

INTELLIGENT CONTROL SYSTEM FOR CURRENT DISTRIBUTION IN A VEHICLE

FIELD OF THE INVENTION

The invention relates to an intelligent control system for current distribution in a vehicle, said system comprising:
- a number of current-consuming actuators
- at least two cable branches for supplying power to the actuators
- intelligent connecting sockets and a communication bus in each cable branch
- current switches present in the connecting sockets and control electronics therefor, and
- a central unit between a current source and the cable branches.

The connecting sockets can be fitted with output-connectors, the actuator connectors being coupled therewith by way of current conductors, or the socket can be directly integrated as a component of the actuator. The connecting socket can also be fitted with an input-connector, which can be provided with control elements for driving the actuators.

BACKGROUND OF THE INVENTION

This type of control systems are prior known e.g. from publications WO 93/10591, WO 95/15594, EP-564943, and WO 97/02965.

These prior known systems involve a number of problems. The systems must be designed and manufactured individually for each application. In terms of production technology and maintenance, such systems are inconvenient and expensive. They do not provide a possibility for flexible expansion or reduction, as the case may be. When some part of the system develops a fault, this may interfere with the operation of the entire system, such that the fault must be mended before the system and the vehicle can be used.

On the other hand, such a system is highly sensitive to defects and malfunctions due to a large amount of necessary two-way communication, which may contain a plurality of simultaneous messages. A bottleneck in communication has been constituted by a central unit, traditionally used in view of controlling the operative working of an entire system.

SUMMARY OF THE INVENTION

An object of the invention is to provide an improved control system, which is flexibly extensible or reducible, as desired, by using a module-composed central unit, wherein the modules are specified for cable branches but connected to a common communication bus for transmitting messages between the cable branches.

Another object of the invention is the optimization of information channels in a system and the distribution of intelligence in a system to various modules in the system in view of reducing the load on and increasing the operating reliability of communication buses.

The objects and aims of the invention are achieved on the basis of characterizing features set forth in the annexed claims 1 to 15.

The non-independent claims disclose preferred embodiments of the invention.

BRIEF DESCRIPTION OF THE DRAWINGS

The invention will now be described in more detail by way of an exemplary embodiment with reference made to the accompanying drawings, in which.

DETAILED DESCRIPTION OF THE INVENTION

Figure 1A:
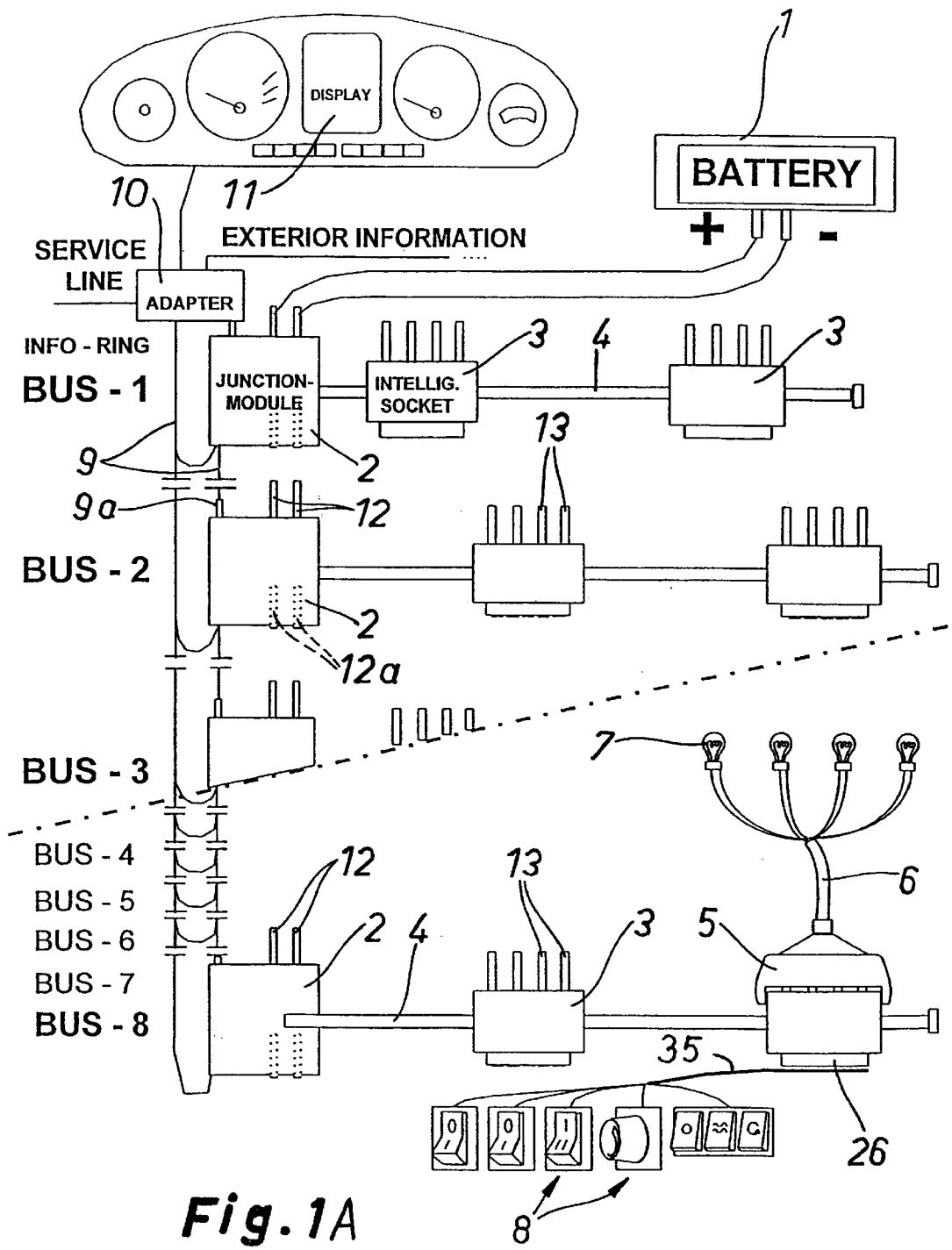
FIG. 1A shows a general block diagram for the physical implementation of a system of the invention.
Figure 1B:
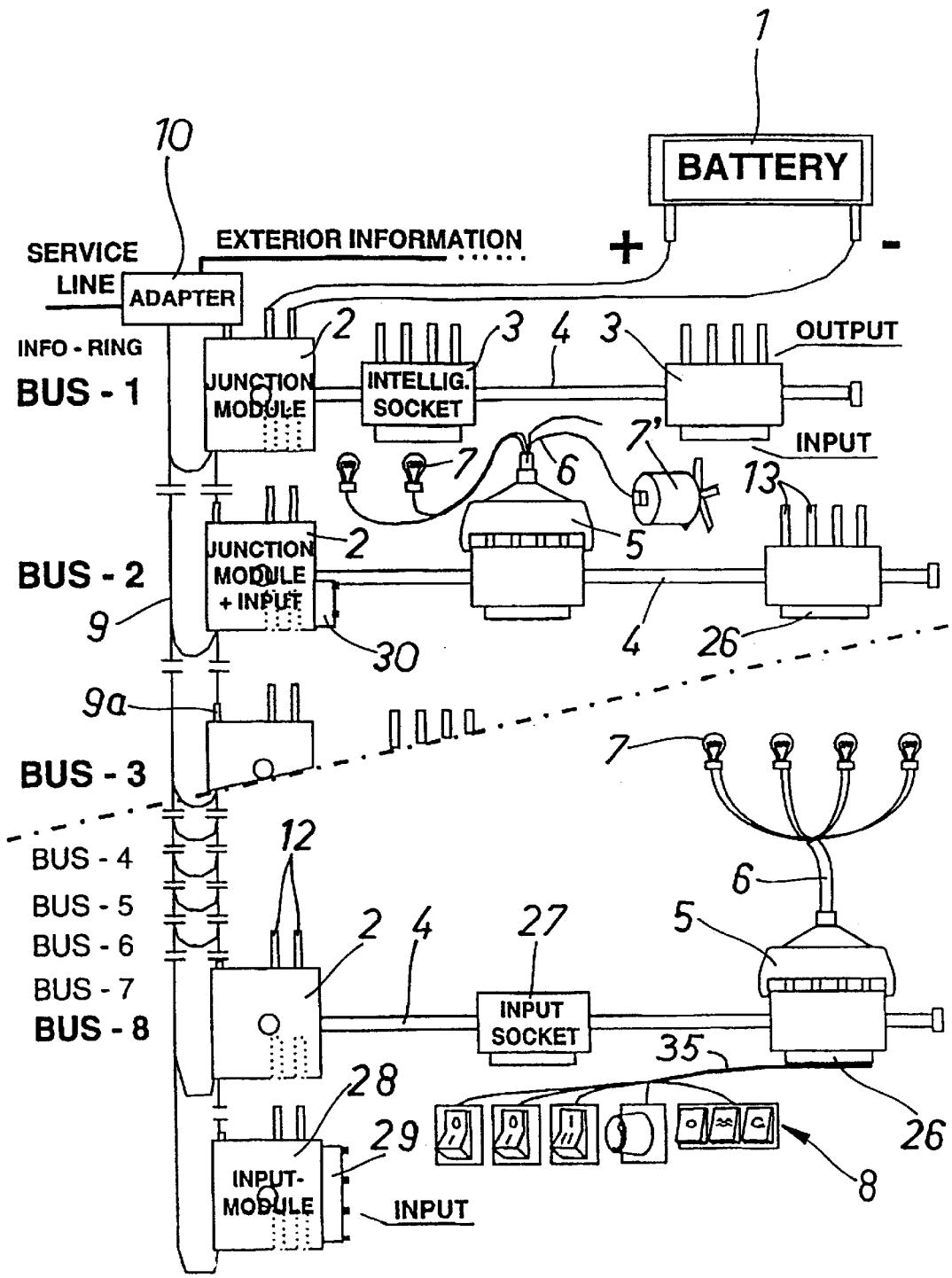
FIG. 1B shows another version of the system of FIG. 1A, depicting alternative arrangements for supplying control messages by means of input-connectors (27; 28; 29; 30) attachable to various parts of the system.

The system depicted in FIG. 1 consists of cable branches 4 and a number of electronics modules in three different types: a junction module 2, an intelligent connecting socket 3, and an adapter and monitoring block 10.

The adapter and monitoring block 10 contains three functions: a detail memory for the system, capable of maintaining itself even at a zero voltage, and a control for an information display 11 for the operator, as well as a monitoring system for high-level communication. In addition, the block 10 takes care of matching communications in other exterior buses (e.g. communication for an engine, a gearbox, or ABS-brakes). The block 10 matches communications of various protocols and standards to the system protocol. A high-level message bus 9 constitutes a part of the adapter and monitoring block 10, which listens to high-level communication and picks up therefrom messages to be stored and to be reported to the operator by means of the display 11. The detail memory contained in the block 10 collects information about all occurrences in the system. As the detail memory becomes fully loaded, the oldest entries go out, i.e. the question is about a so-called FIFO-type (first in, first out) of memory. The block 10 contains a malfunction log, which is used for collecting information on the basis of malfunction messages, i.e. about fuse messages, no-load messages, etc., also according to a FIFO principle.

The operator receives information about a running condition of the system by way of the text display 11, which carries all fault-related information in the form of text messages.

The high-level communication bus 9 is a ring bus, the adapter and monitoring block 10 and all junction modules 2 being in contact therewith. The bus 9 is serially functioning and has a transmission speed which is higher (e.g. about tenfold) than that of low-level buses connected to cable branches 4. A message transmitted into the high-level ring bus 9 is not acknowledged, but each recipient (i.e. junction 2 or block 10) of a message delivers all messages received thereby to the next listener. In case the received message has been delivered by the discussed junction module 2 or the block 10 itself, it will not be delivered on another circuit. Thus, each message completes a full circuit in the ring bus.

The block 10 transmits a monitor pulse (a watch-dog signal) regularly to the high-level ring bus 9. In the absence of a pulse, the block 10 is disconnected from the bus 9 automatically so as not to disturb the others. A respective defect monitoring is also provided by the junction modules 2. The system is usually provided with just one adaptation and monitoring block 10 and it is accompanied by the junction modules 2, generally e.g. underneath the dashboard in an automobile.

The system does not include an actual central unit, which would control and drive the functions of other parts of the system but, instead, the intelligence in the system is distributed to cable-branch specific junction modules 2 and to intelligent connecting sockets 3 present in the cable branches 4. Hence, the central unit is divided into structurally separate junction modules 2, each of which connects to its own cable branch 4. Each junction module 2 controls independently the power supply and the communication transmission of a cable branch attached thereto. The junction module itself does not issue commands for operative action, but transmits communication on two levels, namely between the modules of its own cable branch (low-level communication) and between the junction modules of different cable branches (high-level communication). Thus, a central unit 2,2 only functions as a junction unit for communication and is also capable of handling the supply of power. The junction module 2 has three functions: power supply for the cable branch 4, communication in the cable branch 4 or on a low level, as well as the above-discussed high-level communication in the ring bus 9.

Figure 2:
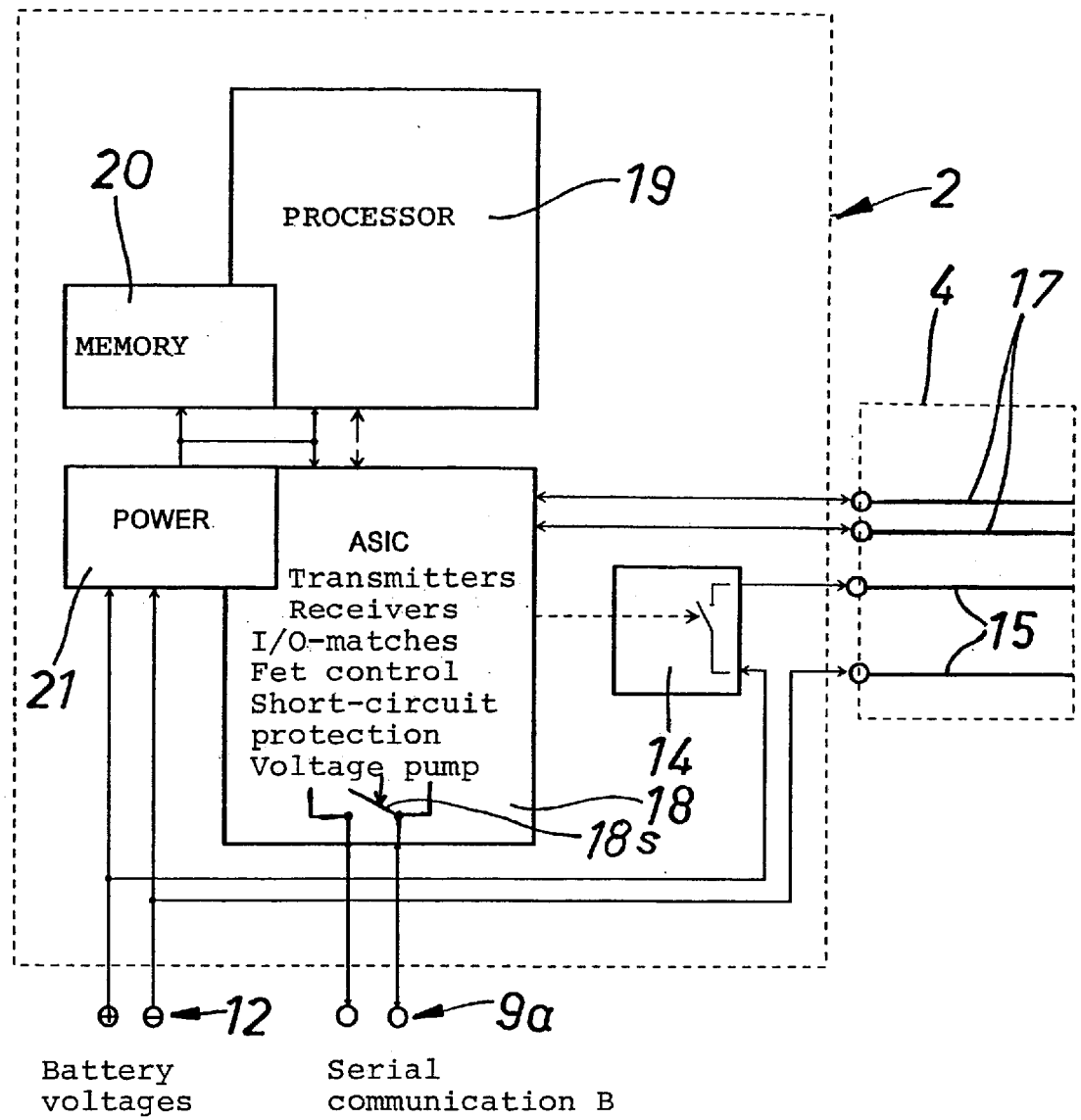
FIG. 2 shows a block diagram for a junction module 2 included in the system of FIG. 1.
Figure 3:
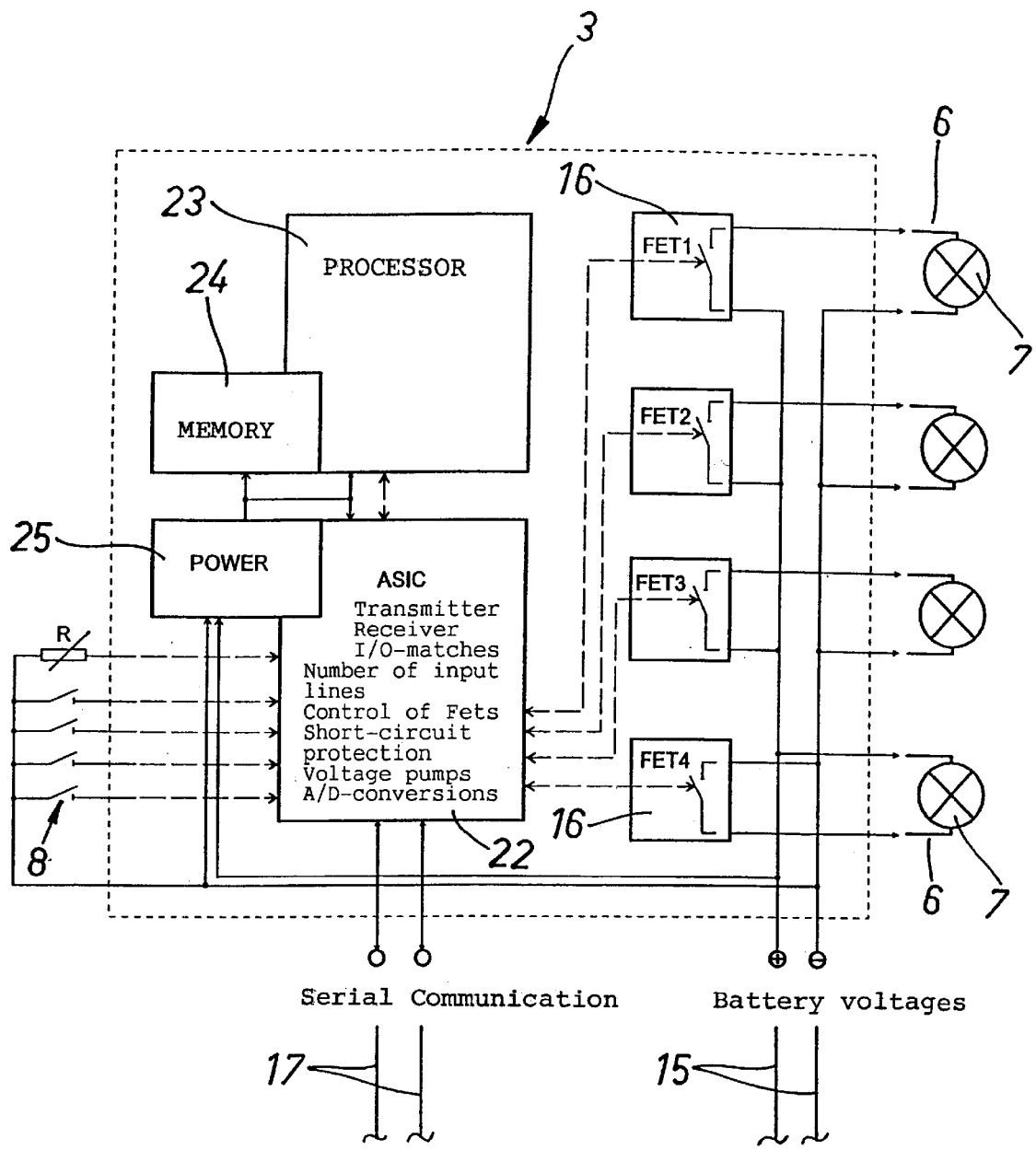
FIG. 3 shows a block diagram for an intelligent connecting socket 3 included in the system of FIG. 1.

The design and operation of a single junction module 2 will now be described in more detail with reference to FIG. 2. The junction module 2 provides through a switch fet 14 all the electricity required by the cable branch 4. The cable is provided with current conductors which are indicated by reference numeral 15. An ASIC-circuit 18 includes a control for the FET 14 and a short-circuit protection which measures the current passing through the FET 14 and integrates the current strength for the determination of a dissipation power remaining in the FET. Thus, the short-circuit protection has a release time which depends not only on the strength of an over-current but also on its duration, in other words, a light over-current can be tolerated for a certain period of time, but in a shortcircuit condition the protection releases quickly. After a release of the shortcircuit protection, the program must switch the FET 14 back on. Protection of the FETs 14 also involves a temperature measurement, which is used in the case of overheating to switch the FET 14 off and the control back on, after the temperature has dropped. Fault conditions, over-current or overheat or other malfunction incidents, result naturally in the transmission of a malfunction message to the high-level bus 9.

Each junction module is fitted with connectors 9a for the communication bus 9 and connectors 12, 12a for power supply. These conectors can be used for linking the junction modules 2 directly to each other to provide a single assembly or a central unit, wherein the number of modules 2 is arbitrarily changeable without such change affecting the operating capability of the central unit. In order not to have a fault in a single junction module 2 interfere with the operation of the rest of the system, each junction module 2 is provided with a switch 18a, which is associated with the high-level communication bus 9 and the closing of which short-circuits the bus 9 to by-pass the discussed faulty junction module. For example, a switch 18a associated with the ASIC-circuit 18 is controlled by a fault-watching signal of the junction module. For an enhanced operating reliability, the number of switches 18a can be two per each junction module. The switch 18a or the switches can be included in the ASIC-circuit 18 or elsewhere in a junction module. The switch 18s can also be designed to disconnect a module-specific transmitter and to short-circuit the loop bus (as described in more detail in reference to FIG. 7).

The communication activity of the module 2 is controlled by a processor 19, which is provided with a memory 20 containing information about all messages required by the functions of the cable branch 4 in contact with the module. As for the messages received thereby from the high-level communication bus 9, each junction module 2 only supplies its own cable branch 4 with those messages that are required there. Thus, it is possible to eliminate some unnecessary communication from the low level.

The low-level communication in bus conductors 17 included in the cable 4 comprises differential serial communication. Naturally, the communication can also be implemented by means of just a single conductor, but the two-conductor differential communication reduces interferences, nor does the failure of one conductor stall the operation. The low-level communication proceeding in the conductors 17 of the cable 4 is started by one of the sockets 3 or the junction module 2. This is when all those that are willing join in the transmission of a message (are synchronized with a starting bit). All transmitters compare the bus condition at each address with the bit transmitted thereby. If the transmitted and received bits are matching, the next address bit will be transmitted. However, if the bus 4/17 is in a dominating mode or condition (zero) in contrast with a transmitted recessive mode (one), it indicates that the bus has others (either socket 3 or junction module 2) in the process of transmitting, the messages of the latter having a higher priority and, thus, all those that have detected the difference proceed to a listening mode. Thus, this bit arbitration makes sure that the most important message is always first to pass through. After the message is completed, a fixed period is allowed to pass before starting another message the same way until all those that are willing have managed to transmit their messages. The junction module 2 must acknowledge the messages received thereby from the communication bus 4/17, with the exception of certain special messages. For example, the synchronizing message for blinkers is not acknowledged, but the switch-on and switch-off messages for a blinker are indeed acknowledged. The junction module 2 allows into the high-level communication bus 9 essentially all messages received thereby from the low level (with the exclusion of certain acknowledgement messages). The junction module 2 does not produce an acknowledgement message to confirm the reception of a message transmitted by the socket 3 until said junction module 2 has received necessary acknowledgements from other sockets 3 in the same branch 4 and only after receiving back the message transmitted thereby into the ring bus 9.

The number of junction modules 2 is always one per each cable branch 4. For example, in an automotive wiring system, the number of cable branches 4 and junction modules 2, respectively, is typically eight. Several cable branches are dictated e.g. by safety regulations as well as a limit set by the maximum current acceptable in a cable.

The design and operation of an intelligent connecting socket 3 are as follows.

The basic function of a socket is the supply of a service current to actuators 7, 7', the socket being thus provided with controllable current switches 16.

The socket 3 includes a communication segment with three basic functions: reading the control inputs received from switches 8, driving the current switches 16 supplying current to the actuators 7, and low-level serial communication into the bus 17 of the cable 4.

The manually operated control elements 8, such as switches, press keys or turn buttons, are connected by way of a cable 35 to an input connector 26 of the socket 3 (FIG. 1). The sockets 3 are fitted with output connectors 5 and cables 6 which are used for the distribution of current to the actuators 7. It is characteristic of the system that any cable branch 4 of the system can be used for transmitting a control message to any other cable branch and hence, to an intelligent socket receiving the message in that other branch.

The socket 3 is provided with four controllable current switches 16, comprising e.g. FETs. Control of the FETs 16 is effected through an ASIC-circuit 22. The ASIC-circuit 22 includes also transmitters and receivers for the serial communication bus 17, I/O-matchings, a short-circuit protection for the FETs 16, and a voltage pump required for the establishment of a control voltage for the FETs present between the plus and the load of a battery. There may be several types of sockets 3, e.g. such that all four switches 16 in an A-type are a high-side type (thus, located between the plus and the load of a battery) and, in a B-type socket, e.g. two switches 16 are of a high-side type and the other two of a low-side type. A B-type socket can be used e.g. for driving a single electric motor in both directions.

In view of protecting each switch fet 16, the ASIC-circuit 22 of the socket 3 is provided with a hardware protection, which is capable of switching off control of the FETs 16 regardless of program commands. The hardware protection measures a current passing through the FET 16 and integrates the current strength for the determination of a dissipation power remaining in the FET. Thus, the hardware protection has a release time which depends not only on the strength but also on the duration of the over-current, i.e. a slight over-current can be tolerated for a while but, upon detecting a short-circuit condition, the protection is released immediately. After the hardware protection is released, the program must switch the FET 16 back on. The protection of FETs also involves a temperature measurement, used in the case of overheating to switch off the FET, and the control back on after the temperature has dropped. In addition to the hardware protection, the supply of a current can be monitored programmatically by means of a current measurement. This feature is called a software protection. The current switch 16 contains also a no-load identification, which functions while the switch is turned off. This load error is checked as the system is started and always as the appropriate load is switched on. All malfunction conditions (over-current, heat, and no-load) lead naturally to the transmission of a malfunction message.

Figure 8:
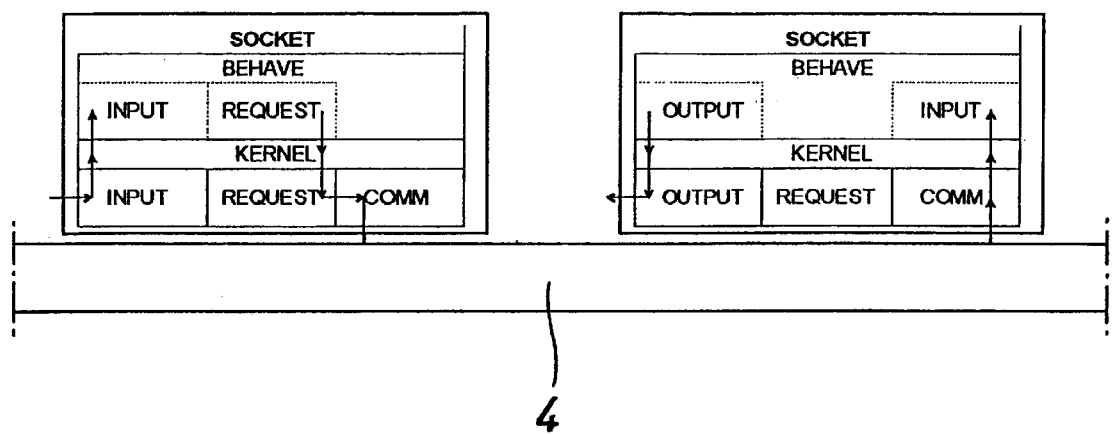
FIG. 8 shows schematically a software configuration and a passage of messages in the connecting socket 3.

The memory 24 can be housed entirely or partially within a processor 23 and it can be constituted by several sub-memories of various types. The memory 24 contains a basic program (kernel) controlling the operation of the processor 23 as well as drive programs, so-called behave programs, individual for each socket 3, which control functions pre-determined for the particular socket 3. FIG. 8 depicts some of the software composition for the socket 3. These socket-specific drive programs identify the messages coming from an input 8 or the serial communication bus 17 and use those as a basis for driving the processor 23 and/or the ASIC-circuit 22 to transmit messages to the serial communication bus 17 and/or to switch on desired FETs 16 for supplying a current to the actuators 7. Hence, the socket-specific behave programs decide a control mode for the switches 16 consistently with the characteristics of the individual loads 7 linked with the switches 16. Thus, all that is required from the bus 17 is an identification code for a desired action. The behave program takes care of which load 7 is driven and when. Hence, the behave programs contained in the processor 23 and in the memory 24 look after the individual control of loads and the messages running along the bus 17 only express desired actions. The messages need not carry any information about the control of loads (which, when, how) or about the sockets that the messages are intended for. The behave program of a socket recognizes when the question is about such a message that the socket must perform its pre-assigned functions. The load-specific individual control information includes e.g. an upper and lower limit for current, an acceptable duration for surge current, action in a malfunction condition, a priority level for a particular function, etc.

The basic program (kernel), which is identical in all sockets of the same type, takes care of controlling the socket switches 18a and communication as well as the processor functions. Thus, the basic program performs the control of all functions of a socket, yet is not capable of independently deciding which actions are to be performed and when. Upon the arrival of any message in a socket, the basic program turns to the behave program to find out which functions are necessitated by this particular message. The behave program informs the basic program of the actions that should be chosen to be performed thereby from amongst all different actions of the socket. Thus, it is the behave program which determines operating responses to various messages specifically for each socket.

The socket 3 listens the low-level communication along the bus conductors 17, picking up therefrom information needed thereby. The socket 3 supplies the bus with acknowledgements for messages received thereby, with a message about a mode switch of its inputs 8/26, and also with messages matching the mode information of the current switches 16. In case the junction module 2 does not acknowledge a message individually for each function within a programmable time lapse, the socket 3 will transmit the message again. On the basis of the acknowledgement message from the junction module 2, the socket 3 is able to conclude that all the same-branch sockets 3 looking for a message have acknowledged the message to the junction module 2 and that the junction module 2 has transmitted the message through the ring bus 9.

It is always preferable to place the sockets 3 in the vicinity of the actuators 7. In practice, whatever is required by the inputs 8/26 and the current switches 16 is not usually available at a common location. For example, the dashboard mostly requires just inputs for reading the switches and the tail end of an automobile needs just current switches for controlling the lights. For this reason, it is sensible that all input controls not be delivered through the sockets 3. This enables the use of one or more alternative arrangements shown in FIG. 1 B for delivering control commands. It is possible to use a separate input-connector 27, which is attached to a desired part of the cable 4. The central unit constituted by the junction modules 2 may further include one or more input modules 28 for control messages, said modules being attachable directly to the high-level communication bus 9. The control messages delivered by control elements (such as 8) attached to an input-connector 29 of the input module 28 are first transmitted into the high-level bus 9, the junction modules 2 picking up therefrom messages to be carried to cable branches assigned thereto.

Thus, the joining together of the input modules and the junction modules 2 is effected directly by means of connector pins the same way as the joining together of the modules 2. Hence, increasing or decreasing the number of input modules bears no effect on the inter-modular power supply or communication, but the junction modules 2 and the input modules together constitute a central unit, the number of modules therein being arbitrarily changeable without such change affecting the operating capability of the central unit. By virtue of the input modules 28 it is possible to reduce the low-level communication in the cable branches. It is a further benefit that the dashboard control elements can be connected by means of short current conductors to the input modules of the central unit in the system. As an alternative to the input module 28, it is possible to provide one or more junction modules 2 with an input-connector 30, the control commands delivered thereby progressing first to the ring bus 9, from which each of the junction modules 2 picks up the messages intended for a cable branch assigned thereto.

Figure 6:
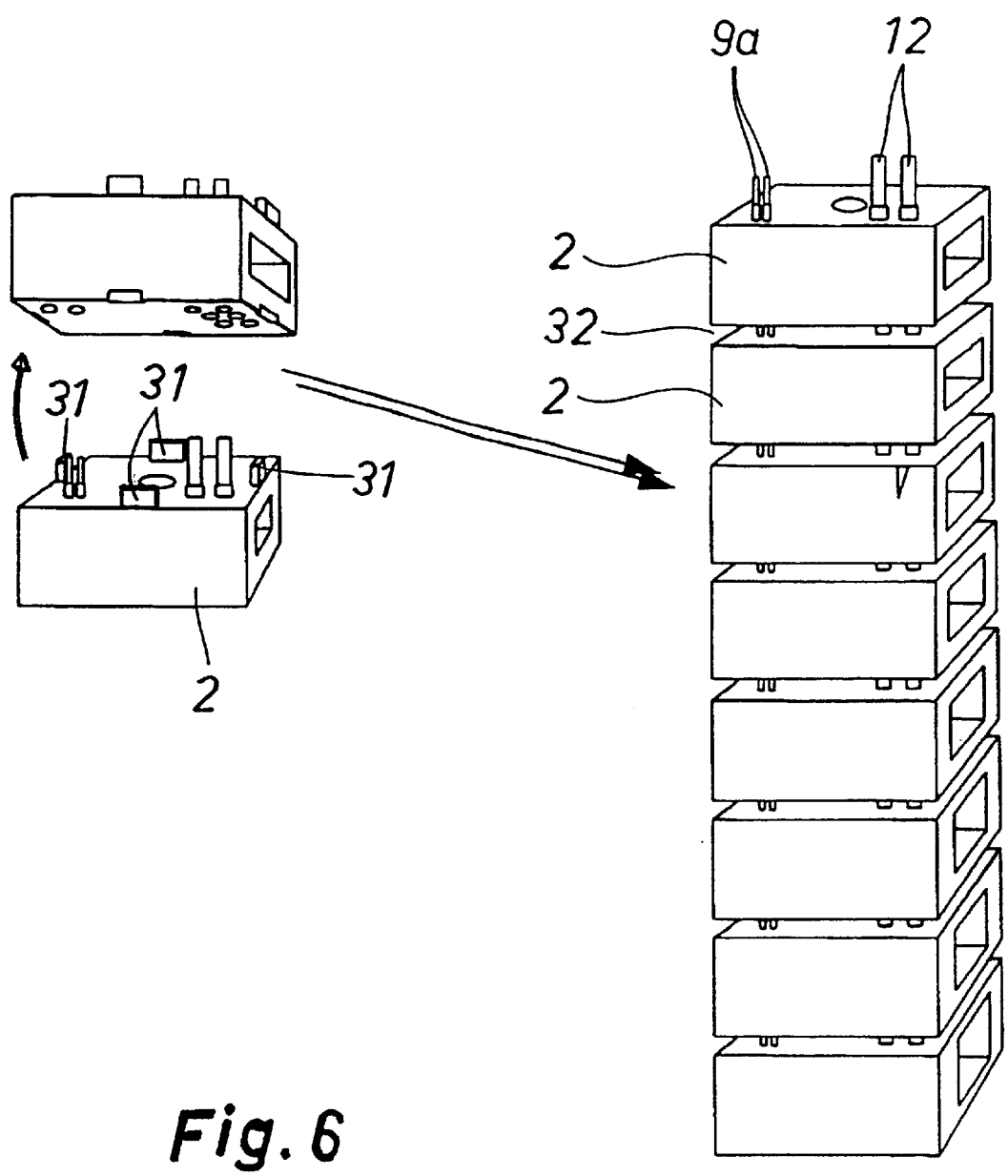
FIG. 6 shows a central unit assembly consisting of modules.

FIG. 6 depicts a central unit constituted by eight junction modules 2 provided with intermediate cooling gaps 32, which are created by means of the appropriate dimensioning of engagement lugs relative to receiving slots therefor. The bottoms of connector pins 12 and 9a are surrounded by liners which press against the rims of pin-receiving holes.

Figure 4:
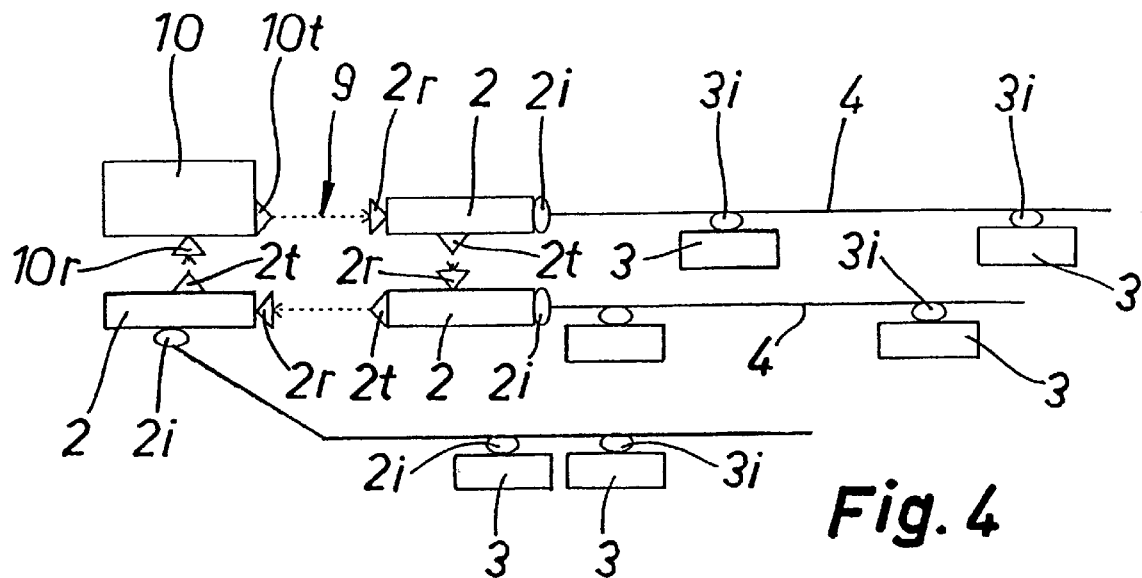
FIG. 4 shows a communication chart for the system of FIG. 1.
Figure 5:
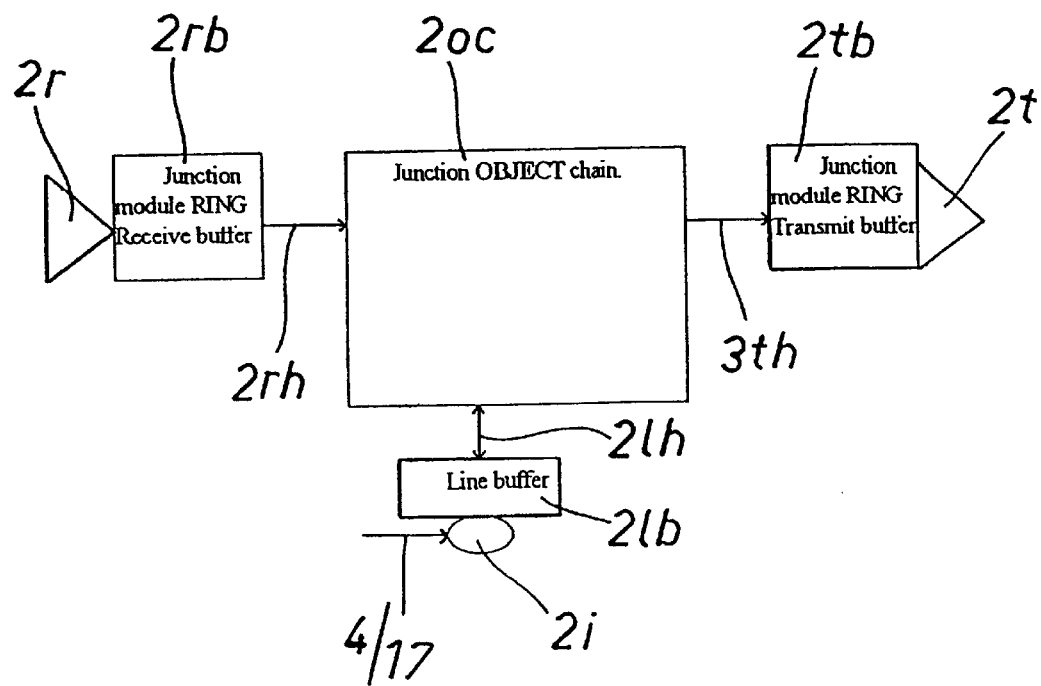
FIG. 5 shows an operating chart (software block-diagram) contained in the junction module 2 included in the chart of FIG. 4.

A programmatic operating chart for the system, especially in terms of the central unit and the ring bus 9 associated therewith, is shown in FIGS. 4 and 5. The two-way communication between the junction module 2 and the bus 4/17 is effected through the intermediary of an interface 2i, a line buffer 2lb, and a handler 2lh for line messages. The handler 2lh for line messages checks each incoming message by comparing the same with information stored in the junction module about all messages required by the functions of a cable branch associated with that particular message. When a match is found, the message is able to progress from the high-level ring bus 9 to the low-level bus 4/17. For communication in the high-level bus 9, each module 2 is provided with the following operating elements: a ring bus receiver 2r, a receive buffer 2rb therefor, a handler 2rh for received messages, a list of messages for functions required by a cable branch (junction object chain) 2oc, a handler 3th for messages to be transmitted into the ring bus, a transmit buffer 2tb, and a ring bus transmitter 2t for the junction module.

The handler 2lh of line messages records and acknowledges all messages coming from the low-level bus 4/17, if there is a match found for those in the junction object chain 2oc. The handler 3th of high-level message transmissions distributes the requested messages into the ring bus 9 and records the message-matching object as reserved until the receive handler 2rh receives the same message from the ring bus, at which time the object is recorded as nonreserved.

Figure 7:
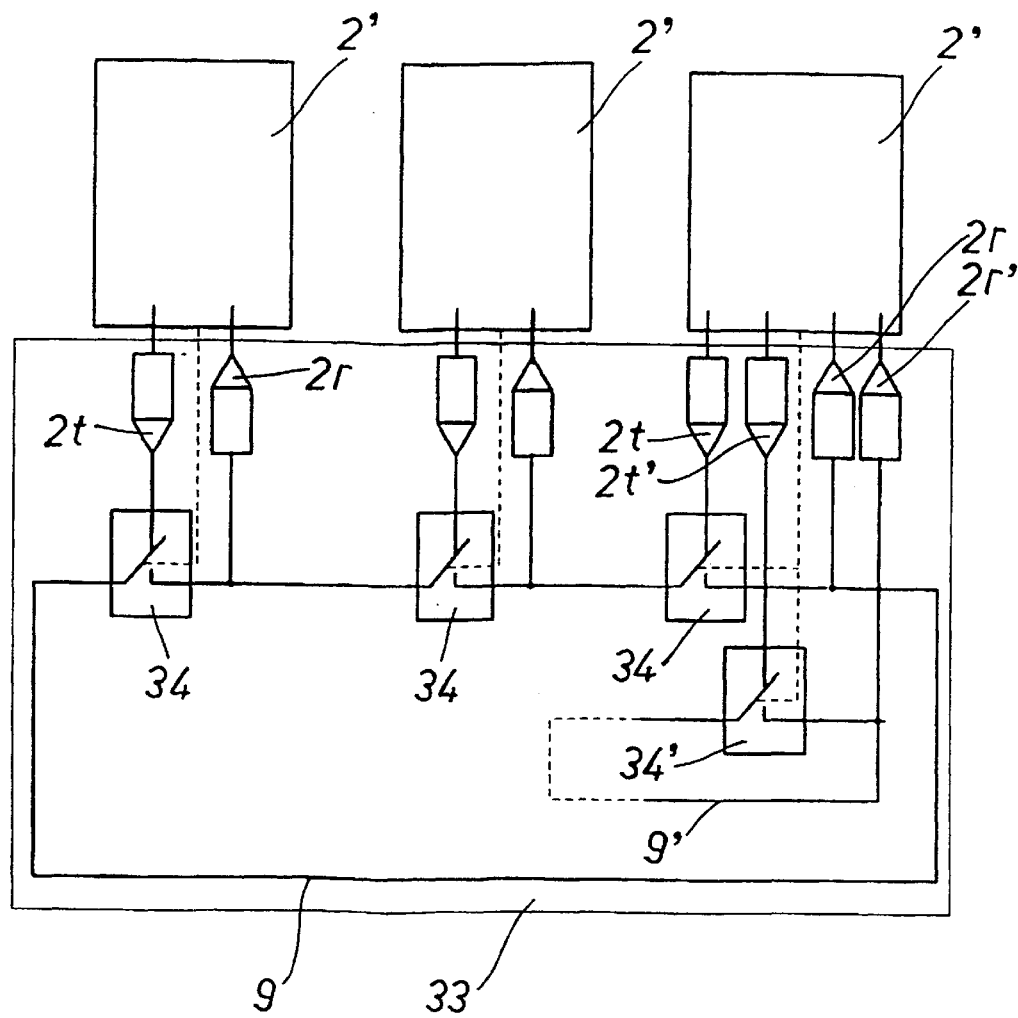
FIG. 7 shows a block diagram for an alternative embodiment of a central unit.

In the exemplary embodiment of FIG. 7, the ring bus 9 is built in a single module 33 which constitutes a common mounting base and wiring base for junction modules 2'. The communication elements of the ring bus 9, such as receivers 2r and transmitters 2t, can be arranged partially or entirely on this mounting base module 33 for junction modules. In this case, the operating reliability can be enhanced by building a parallel ring bus 9' and dual parallel communication elements 2t, 2t'; 2r, 2r' for the ring buses 9, 9'. In addition, the mounting base module 33 can be provided with junction-module specific shunt switches 34 for maintaining the ring bus intact in a malfunction condition of its own communication elements, and also when the junction modules 2' are faulty or disconnected from the mounting base module 33. In the described case, the switch 34 disconnects the transmitter 2t and short-circuits the ring bus 9, but maintains the receiver 2r in a listening mode.

The invention is not limited to the above-described exemplary embodiments. For example, the ring bus 9 can be replaced with a two-way serial communication bus. In this case, the disconnecting/shunt switches 18a, 34 must be respectively modified in such a way that, instead of a single serial switch, there will be two disconnecting switches in parallel. When the number of junction modules is more than four, the ring bus is more beneficial as it is capable of transmitting simultaneously several messages without reducing data transmission speed. The ring bus 9 can also be implemented by means of discrete modules, which are attached by means of connectors to the junction modules 2.

What is claimed is:

1. An intelligent control system for current distribution in a vehicle, said system comprising:
  a number of current-consuming actuators (7),
  at least two cable branches (4) with current conductors (15) for supplying power to the actuators,
  intelligent connecting sockets (3) between each cable branch (4) and the actuators (7), the intelligent connecting sockets further comprising a processor, an electronic memory operably connected to the processor, and control software residing on the memory and executable by a processor to control the actuators,
  a communication bus (4/17) in each cable branch for communication between the intelligent connecting sockets (3) connected to any cable branch (4),
  current switches (16) present in the connecting sockets and control electronics (22–24) therefore, and
  a central unit between a current source (1) and each of the cable branches (4) wherein the central unit is a single assembly and is divided into structurally separate junction modules (2), each of which connects to its own cable branch (4), wherein each junction module (2) controls independently the power supply of a cable branch (4) attached thereto and its upper current limit, wherein each junction module (2) includes a programmably controlled solid state ON/OFF switch element (14) for controlling the upper current limit of the cable branches, and wherein there are first terminals (12) for the power supply between the junction modules (2) and second terminals (9a) for establishment of a communication connection (9, 9a) between the junction modules (2) and between the communication busses (4/17) in each cable branch, whereby the number of junction modules in the central unit can be increased or reduced without breaking the power supply or the communication connection (9, 9a) between the cable branches.

2. A system as set forth in claim 1, characterized in that each junction module (2) includes elements (2i, 2lb, 2lh; 18) for the reception and transmission of the communication, so-called low-level communication, of the cable branch (4/17), and that the central unit is further provided with elements (2th, 2tb, 2t; 9; 2r, 2rb, 2rh) for the transmission and reception of the communication, so-called high-level communication, between the junction modules (2).

3. A system as set forth in claim 2, characterized in that the high-level communication elements include a ring bus (9) which the junction modules (2) are linked with.

4. A system as set forth in claim 1, characterized in that the communication busses (4/17) in each cable branch are connected via said second terminals (9a) of the central unit with an adapter and monitoring block (10), which includes a detail memory and which controls an information display (11) for the operator, and that the adapter and monitoring block (10) also takes care of matching the communications in other, exterior buses.

5. A system as set forth in claim 1, characterized in that each junction module (2) has information about all messages (2oc) required by the functions of a cable branch (4) attached thereto and, each junction module (2) transmits into its own cable branch only those messages that are necessary there.

6. A system as set forth in claim 4, characterized in that each junction module (2) supplies the communication bus with monitor messages (watch-dog signal) and, in the absence of such a message, the adapter and monitoring block (10) informs the display of the identifier of a faulty junction module.

7. A system as set forth in claim 1, characterized in that each junction module (2) is provided with a switch (18s, 34) to by-pass the communication bus (17) of a cable branch (4) connected with the discussed junction module (2, 2').

8. A system as set forth in claim 1, characterized in that the system further includes an input connector (26) to be coupled with the connecting socket (3) and provided with control elements (8) for controlling actuators (7), and that the connecting socket (3) is provided with a processor (23) for reading the condition or mode of the control elements (8) associated with the input connector (26) and supplies the communication bus (17) of the cable branch (4) with a message about a change in the condition or mode of the control elements (8), and that the junction module (2) receives this message and another junction module (2) transmits it to the communication bus (17) of another cable branch (4).

9. A system as set forth in claim 1, characterized in that the processor (23) of each connecting socket (3) listens to the communication bus (17) and picks up therefrom the messages identified thereby as intended for itself.

10. A system as set forth in claim 1, characterized in that the system further includes output connectors (5) to be coupled with the connecting sockets (3) and to which the connectors of the actuators (7) are coupled by way of current conductors (6).

11. A system as set forth in claim 1, characterized in that the central unit is further provided with an input module (28) for input of control messages to the communication bus.

12. A system as set forth in claim 1, characterized in that the junction module (2) is fitted with an input terminal (30) for input of control messages to the communication bus.

13. A system as set forth in claim 1, characterized in that a separate input terminal (27) for control messages is connected directly to the communication bus (17) of the cable (4).

14. A system as set forth in claim 1, characterized in that the junction modules (2) are provided with engagement lugs (31) which are dimensioned to leave cooling gaps (32) between the coupled junction modules.

15. A system as set forth in claim 1, characterized in that the central unit (2,2) only takes care of power supply and communication transmission of the cable branches (4), and that the intelligence required for the individual control of various functions of the connecting sockets (3) is decentralized to the connecting sockets (3) and stored in individual behave programs present in a memory (24) of each connecting socket (3).

16. An intelligent control system for current distribution in a vehicle, said system comprising:

a number of current-consuming actuators (7)

at least two cable branches (4) with current conductors (15) for supplying power to the actuators intelligent connecting sockets (3) between each cable branch (4) and the actuators (7)

a communication bus (4/17) in each cable branch for communication between the intelligent connecting sockets (3) connected to any cable branch (4)

current switches (16) present in the connecting sockets and control electronics (22–24) therefor, and a central unit between a current source (1) and each of the cable branches (4) characterized in that a cable-branch specifically module-composed central unit (2, 2), having its modules (2) linked to each other to provide a single assembly, takes care of i) power supply and control of upper current limit of the power supply of the cable branches (4); and ii) communication transmission between the cable branches (4) and that the intelligence required for the individual control of various functions of the connecting sockets (3) is decentralized to the connecting sockets (3) and stored in individual behave programs present in a memory (24) of each connecting socket (3).

* * * * *